United States Patent
Lee et al.

(10) Patent No.: US 8,111,914 B2
(45) Date of Patent: Feb. 7, 2012

(54) METHOD AND APPARATUS FOR ENCODING AND DECODING IMAGE BY USING INTER COLOR COMPENSATION

(75) Inventors: Yun-gu Lee, Yongin-si (KR);
Byung-cheol Song, Suwon-si (KR);
Nak-hoon Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1063 days.

(21) Appl. No.: 12/013,040

(22) Filed: Jan. 11, 2008

(65) Prior Publication Data
US 2008/0304759 A1 Dec. 11, 2008

(30) Foreign Application Priority Data
Jun. 11, 2007 (KR) .................... 10-2007-0056759

(51) Int. Cl.
*G06T 9/00* (2006.01)
*H04N 11/02* (2006.01)

(52) U.S. Cl. ........ 382/166; 382/233; 382/236; 382/238; 348/394.1; 348/409.1; 375/240.12

(58) Field of Classification Search .................. 382/166, 382/233, 236, 238; 348/394.1, 409.1; 375/240.12
See application file for complete search history.

(56) References Cited

U.S. PATENT DOCUMENTS

| 6,081,551 | A * | 6/2000 | Etoh ............................ 375/240 |
| 2005/0013370 | A1* | 1/2005 | Kim et al. ................ 375/240.16 |
| 2005/0281473 | A1* | 12/2005 | Kim et al. ..................... 382/236 |
| 2007/0154087 | A1* | 7/2007 | Cho et al. ...................... 382/166 |
| 2007/0206872 | A1* | 9/2007 | Song .............................. 382/236 |
| 2008/0008238 | A1* | 1/2008 | Song ........................ 375/240.11 |
| 2008/0008239 | A1* | 1/2008 | Song ........................ 375/240.12 |
| 2008/0019597 | A1* | 1/2008 | Song .............................. 382/233 |
| 2008/0043840 | A1* | 2/2008 | Song ........................ 375/240.11 |
| 2008/0247641 | A1* | 10/2008 | Rasmusson et al. ......... 382/166 |

* cited by examiner

*Primary Examiner* — Jon Chang
(74) *Attorney, Agent, or Firm* — Sughrue Mion, PLLC

(57) ABSTRACT

Provided are an image encoding method and apparatus and an image decoding method and apparatus that are capable of canceling a correlation remaining in a residual image by predicting the residual image by using residual pixel values of restored neighboring pixels of a current block and then encoding only the difference between the residual image and a predicted image of the residual image, where the residual image is obtained using an inter color compensation algorithm that predicts one of a plurality of color component images constituting an image by using one of the remnants of the color component images.

25 Claims, 10 Drawing Sheets

REFERENCE PICTURE OF
FIRST COLOR COMPONENT IMAGE
(610)

CURRENT PICTURE OF
SECOND COLOR COMPONENT IMAGE
(620)

METHOD AND APPARATUS FOR ENCODING AND DECODING IMAGE BY USING INTER COLOR COMPENSATION

CROSS-REFERENCE TO RELATED PATENT APPLICATIONS

This application claims priority from Korean Patent Application No. 10-2007-0056759, filed on Jun. 11, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to image encoding and decoding, and more particularly, to an image encoding method and apparatus and an image decoding method and apparatus capable of canceling a correlation remaining in a residual image by predicting the residual image by using residual neighboring pixel values of a current block and then encoding only the difference between the residual image and the predicted residual image, where the residual image is obtained using an inter color compensation algorithm that predicts a color component image from among a plurality of color component images constituting an image by using one of the remaining color component images.

2. Description of the Related Art

In general, color images are originally obtained in an RGB color format. Also, an RGB color image is encoded by transforming the format of the image into a color format, such as a YUV (or YCbCr) color format. Here, Y stands for a luminance component, and U (or Cb) and V (or Cr) stand for chrominance components. In the case of an RGB image, information is evenly distributed in all R, G and B components thereof. However, in the case of a YUV (or YCbCr) image, most information is contained in the Y component and less information is contained in the U (or Cb) and V (or Cr) components. Thus, the compression efficiency of a YUV (or YCbCr) image is high. In order to further improve the compression efficiency, the U (or Cb) and V (or Cr) components of the YUV (or YCbCr) image, which are chromaticity components, are sampled to a quarter of their original size in order to obtain a YUV (or YCbCr) 4:2:0 image.

However, if the U (or Cb) and V (or Cr) components are sampled to a quarter of the original size, color distortion occurs in the YUV (or YCbCr) 4:2:0 image, thereby preventing a high-quality image from being obtained. Accordingly, there is a need for a method of effectively encoding a YUV (or YCbCr) 4:4:4 image without sampling the U (or Cb) and V (or Cr) components thereof. Recently, Residual Color Transform (RCT) that is a technique for directly encoding an RGB 4:4:4 image has been introduced in order to remove color distortion occurring when an RGB image is transformed into the YUV (or YCbCr) format.

Coding efficiency is degraded when a conventional encoding method is applied in order to directly encode an image, such as a YUV (or YCbCr) 4:4:4 image or an RGB 4:4:4 image, which includes color components having the same resolution. Thus, when a YUV (or YCbCr) 4:4:4 image is encoded or an RGB image is encoded directly in an RGB domain without transforming the image into the YUV (or YCbCr) format, there is a need to develop a method of improving coding efficiency by performing prediction according to the statistical characteristics of the image while guaranteeing the high quality of the image.

SUMMARY OF THE INVENTION

The present invention provides an image encoding method and apparatus and an image decoding method and apparatus that are capable of improving coding efficiency by predicting a first color component image from among a plurality of color component images included in a received image by using a second color component that is one of the remaining color component images, based on the correlation between the color component images, and then canceling the correlation remaining in a residual image representing the difference between the original image and the predicted image of the first color component image.

According to an aspect of the present invention, there is provided a method of encoding an image, the method including generating a predicted block of a current block that is to be encoded in a second color component image from among two or more color component images contained in a received image, by using an encoded and restored first color component image of the two or more color component images; generating a first residual block by calculating the difference between the predicted block and the current block of the second color component image; predicting neighboring pixels of the current block of the second color component image by using corresponding neighboring pixels of a reference block of the first color component image; generating a predicted residual block by using residual neighboring pixels representing the differences between the predicted neighboring pixels of the current block of the second color component image and the original neighboring pixels of the current block, where the predicted residual block is a predicted block of the first residual block; and generating a second residual block by calculating the difference between the first residual block and the predicted residual block.

According to another aspect of the present invention, there is provided an image encoding apparatus comprising a predicted block generation unit which generates a predicted block of a current block that is to be encoded in a second color component image, which is one of two or more color component images contained in a received image, by using a reference block of an encoded and restored first color component image of the two or more color component images; a first residual block generation unit which generates a first residual block by calculating the difference between the predicted block and the current block of the second color component image; a neighboring pixel prediction unit which predicts neighboring pixels of the current block of the second color component image by using corresponding neighboring pixels of the reference block of the first color component image; a predicted residual block generation unit which generates a predicted residual block by using residual neighboring pixels representing the differences between predicted pixels of neighboring pixels of the current block of the second color component image and the original neighboring pixels of the current block, where the predicted residual block is a predicted block of the first residual block; and a second residual block generation unit which generates a second residual block by calculating the difference between the first residual block and the predicted residual block.

According to another aspect of the present invention, there is provided a method of decoding an image, the method comprising decoding a first color component image which is one of two or more encoded color component images contained in a received bitstream; generating a predicted block of a current block that is to be decoded in a second color component image of the two or more encoded color component images by using a reference block of the decoded first color component image; predicting neighboring pixels of the current block of the second color component image by using corresponding neighboring pixels of the reference block of the first color component image; generating a predicted residual block by using residual neighboring pixels representing the differences between predicted pixels of the neighboring pixels of the current block of the second color component image and previously restored neighboring pixels of the current block, where the predicted residual block corresponds to a predicted block of a first residual block representing the difference between the current block and the predicted block; generating the first residual block by combining the predicted residual block and a second residual block which represents the difference between the first residual block and the predicted residual block, where the second residual block is included in the bitstream; and decoding the current block by combining the first residual block and the predicted block.

According to another aspect of the present invention, there is provided an image decoding apparatus comprising a predicted block generation unit which generates a predicted block of a current block that is to be decoded in a second color component image, which is one of two or more encoded color component images contained in a received bitstream, by using a reference block of a decoded first color component image of the two or more encoded color component images; a neighboring pixel prediction unit which predicts neighboring pixels of the current block of the second color component image by using corresponding neighboring pixels of the reference block of the first color component image; a predicted residual block generation unit which generates a predicted residual block by using residual neighboring pixels representing the differences between predicted pixels of the neighboring pixels of the current block of the second color component image and previously restored neighboring pixels of the current block, where the predicted residual block corresponds to a predicted block of a first residual block representing the difference between the current block and the predicted block; a residual block restoration unit which generates the first residual block by combining the predicted residual block and a second residual block which represents the difference between the first residual block and the predicted residual block, where the second residual block is included in the bitstream; and an addition unit which decodes the current block by combining the first residual block and the predicted block.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of the present invention will now be described more fully with reference to the accompanying drawings.

In general, a certain correlation is present among a plurality of color component images constituting an input image. In the present invention, a predetermined first color component image from among a plurality of color component images constituting an input image is first prediction encoded according to a general image encoding method, such as the H.264 standard, and then inter color compensation is applied in order to generate a predicted image of another color component image from the restored first color component image. In inter color compensation, one color component image is predicted from another color component image, based on the correlation between the color component images. For example, if an input image consists of R.G.B color components, a G color component image is first predicted and encoded, and then the R or B color component image is predicted from the restored G color component image by using inter color compensation.

According to the present invention, a correlation remaining in a residual block is removed by predicting a neighboring pixel of a current block of the second color component image by using neighboring pixels of the current block of a second color component image and neighboring pixels of a reference block of a first color component image, and then predicting a residual block of the current block by using a residual pixel representing the difference between neighboring pixels of the predicted block and restored neighboring pixels of the current block.

Figure 1:
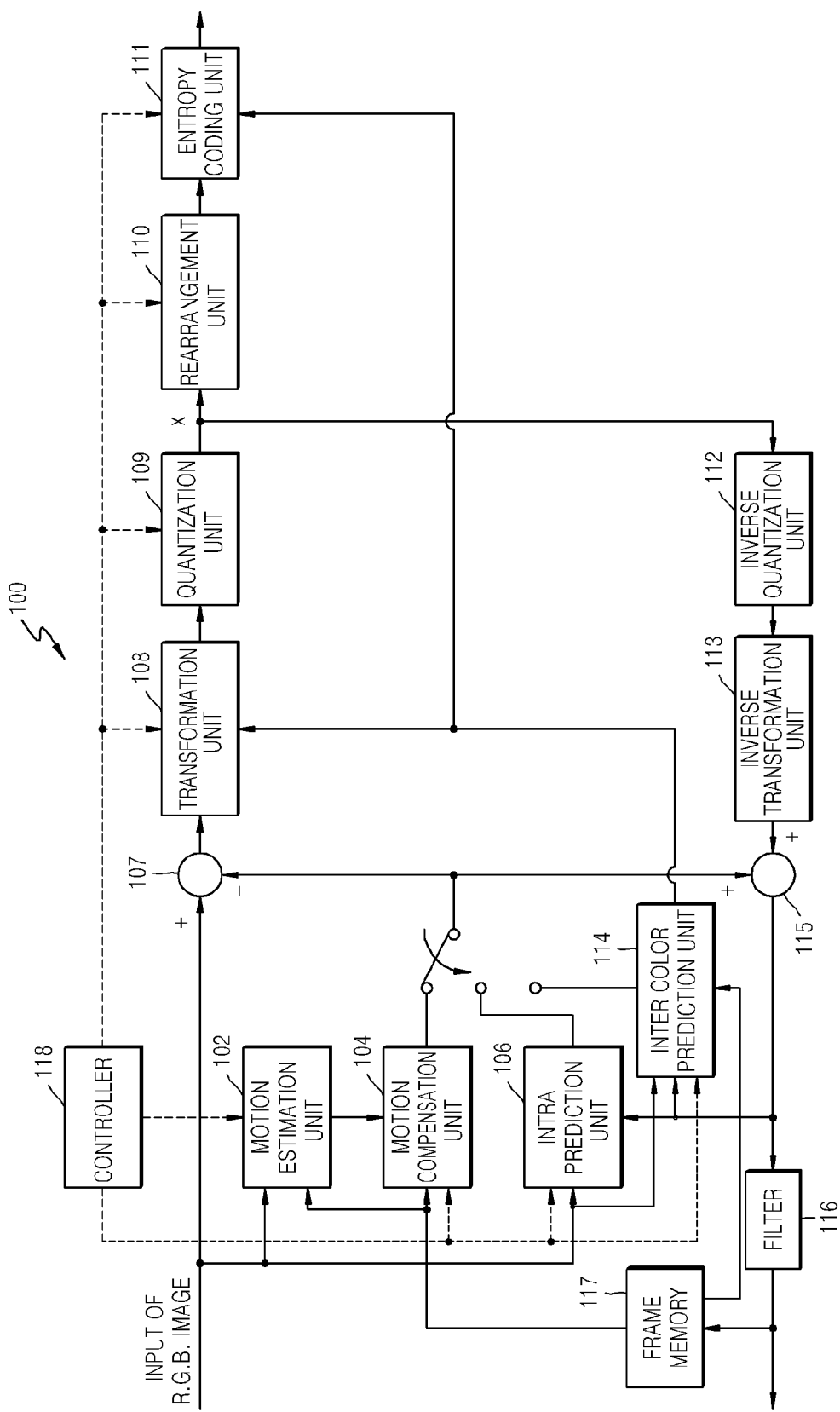
FIG. 1 is a block diagram of an image encoding apparatus according to an exemplary embodiment of the present invention.

FIG. 1 is a block diagram of an image encoding apparatus 100 according to an exemplary embodiment of the present invention. Referring to FIG. 1, the image encoding apparatus 100 includes a motion estimation unit 102, a motion compensation unit 104, an intra prediction unit 106, a subtraction unit 107, a transformation unit 108, a quantization unit 109, a rearrangement unit 110, an entropy coding unit 111, an inverse quantization unit 112, an inverse transformation unit 113, an inter color prediction unit 114, an addition unit 115, a filter 116, a frame memory 117, and a controller 118.

A first color component image selected from among a plurality of color component images constituting an input image is encoded according to a general image encoding method. First, a process of encoding the first color component image will be described.

The motion estimation unit 102 generates a motion vector by performing motion estimation on a pixel block having a predetermined size of the first color component image selected from among the color component images, and then delivers the motion vector to the motion compensation unit 104. The motion compensation unit 104 generates a predicted block of a block that is to be encoded in the first color component image by obtaining a corresponding block of a reference frame indicated by the motion vector.

The intra prediction unit 106 performs intra prediction so as to predict a predicted block of a current block from a current frame. In detail, the intra prediction unit 106 divides the first color component image into equal pixel blocks. Then, the intra prediction unit 106 performs intra prediction on the equal pixel blocks according to an intra prediction mode matching the sizes of the pixel blocks, e.g., an intra 16×16 prediction mode, an intra 4×4 prediction mode, or an intra 8×8 prediction mode.

The subtraction unit 107 generates a residual block by subtracting a predicted block obtained using inter predicting or intra predicting from an input block of the first color component image. Then, the residual block is transformed into a frequency domain by the transformation unit 108 and then is quantized by the quantization unit 109. The quantized transform coefficients are rearranged by the rearrangement unit 110, encoded by the entropy coding unit 111 and then output in the form of a bitstream.

The transformed and quantized residual block is inversely quantized by the inverse quantization unit 112 and inversely transformed by the inverse transformation unit 113. The addition unit 115 combines the inversely quantized and transformed residual block and the predicted block, thus restoring a pixel block of the first color component image. The restored first color component image passes through the filter 116 that performs deblocking filtering and then is stored in the frame memory 117 so that it can be used for inter prediction of a subsequent frame. The restored first color component image is also input to the intra prediction unit 106 so that it can be used as a reference image for intra prediction of a subsequent pixel block. Furthermore, the restored first color component image is input to the inter color prediction unit 114 for prediction of the other color component images.

Figure 2:
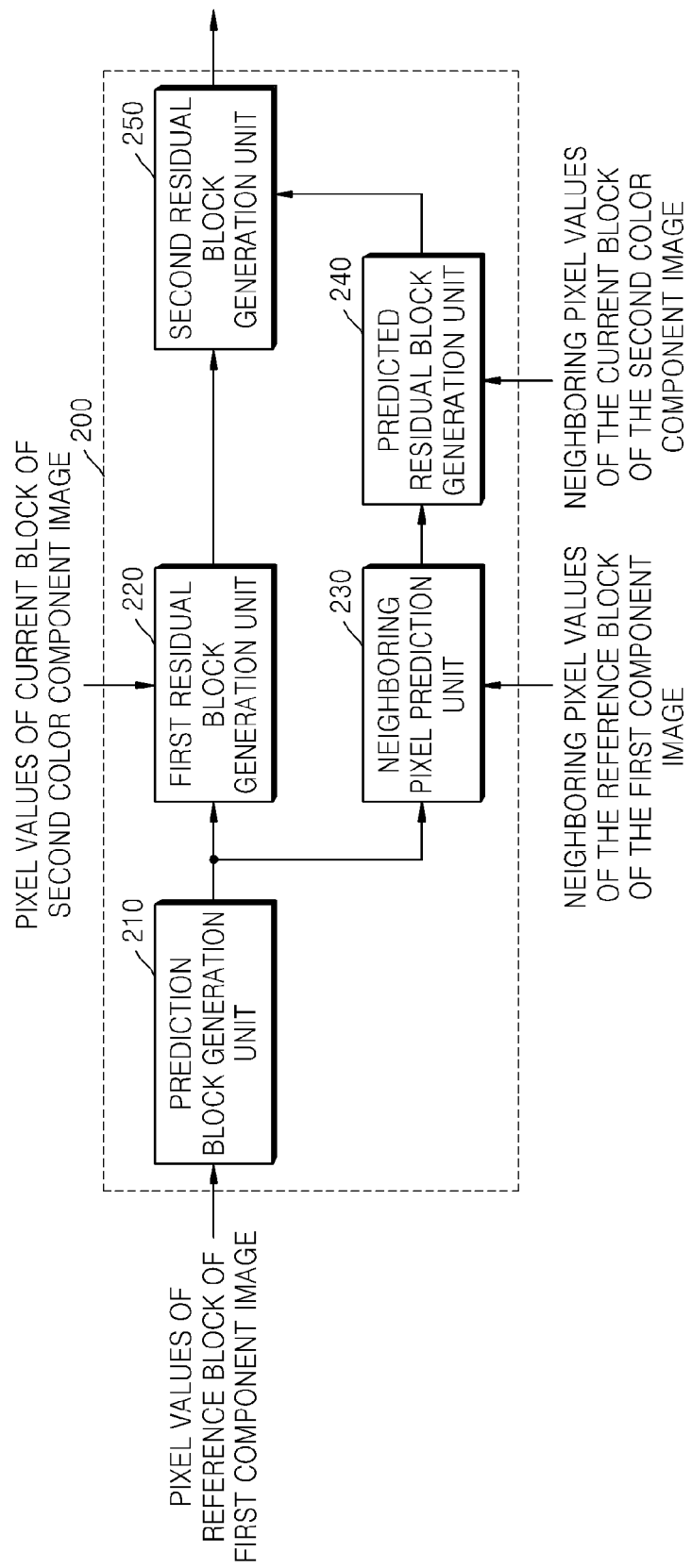
FIG. 2 is a block diagram of an inter color prediction apparatus according to an exemplary embodiment of the present invention.

FIG. 2 is a block diagram of an inter color prediction apparatus 200 according to an exemplary embodiment of the present invention. The inter color prediction apparatus 200 corresponds to the inter color prediction unit 114 illustrated in FIG. 1.

Referring to FIG. 2, the inter color prediction apparatus 200 includes a predicted block generation unit 210, a first residual block generation unit 220, a neighboring pixel prediction unit 230, a predicted residual block generation unit 240, and a second residual block generation unit 250.

The predicted block generation unit 210 generates a predicted block of a current block that is to be encoded in a second color component image of an input image by using the values of pixels of a reference block of a first color component image that has been encoded and restored, according to the inter color compensation algorithm.

Figure 3:
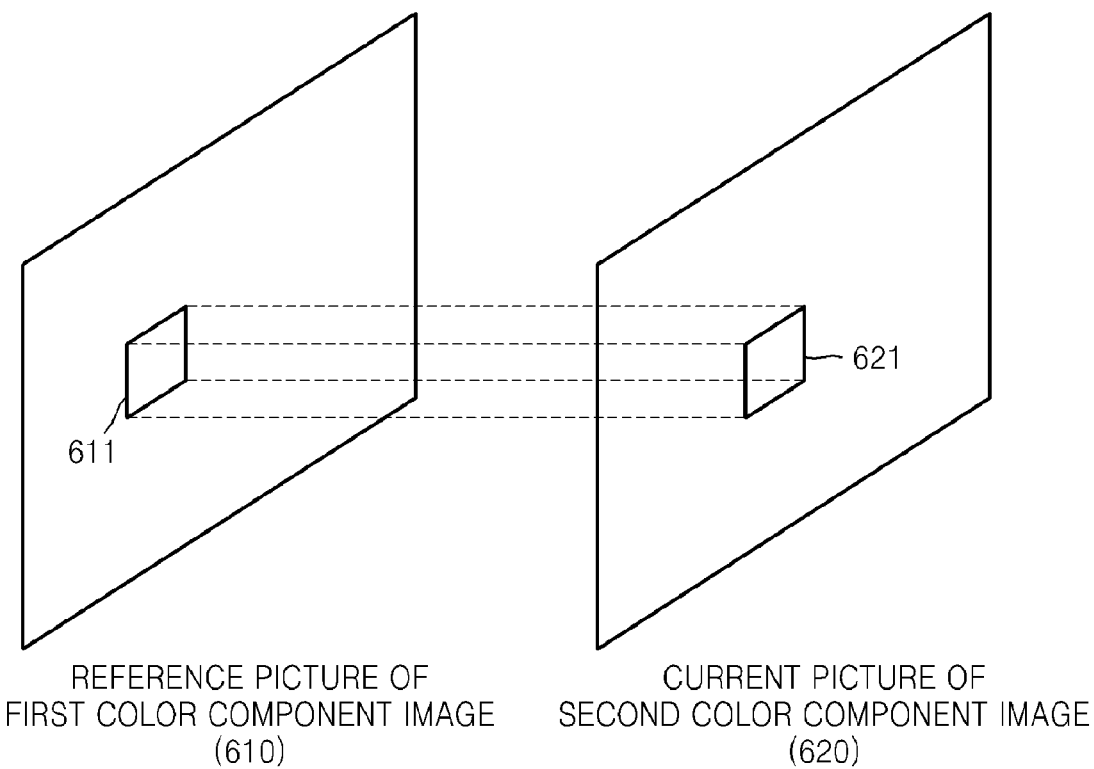
FIG. 3 is a diagram illustrating the relationship between a reference block of a first color component image that was encoded and restored, and a current block of a second color component image that is to be encoded, according to an exemplary embodiment of the present invention.
Figure 4A:
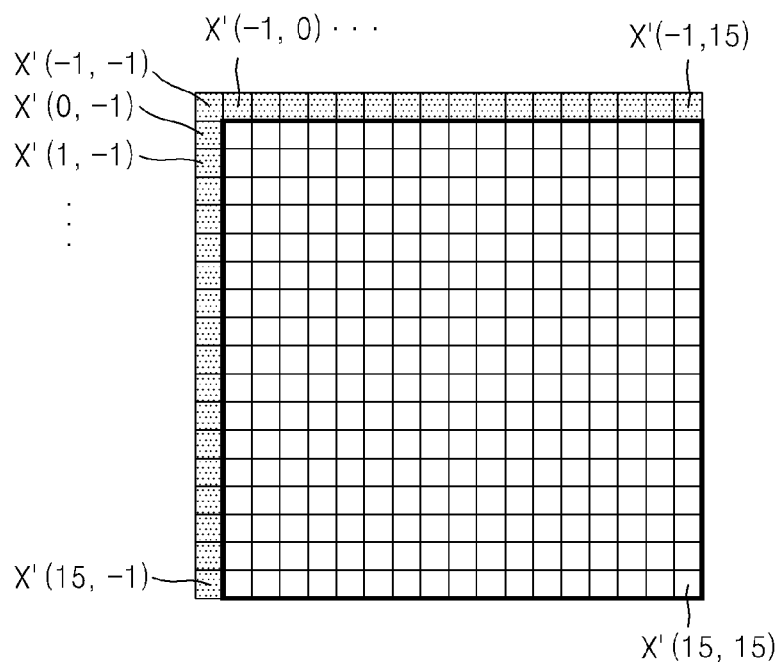
FIG. 4A is a reference diagram illustrating an inter color compensation algorithm according to an exemplary embodiment of the present invention.
Figure 4B:
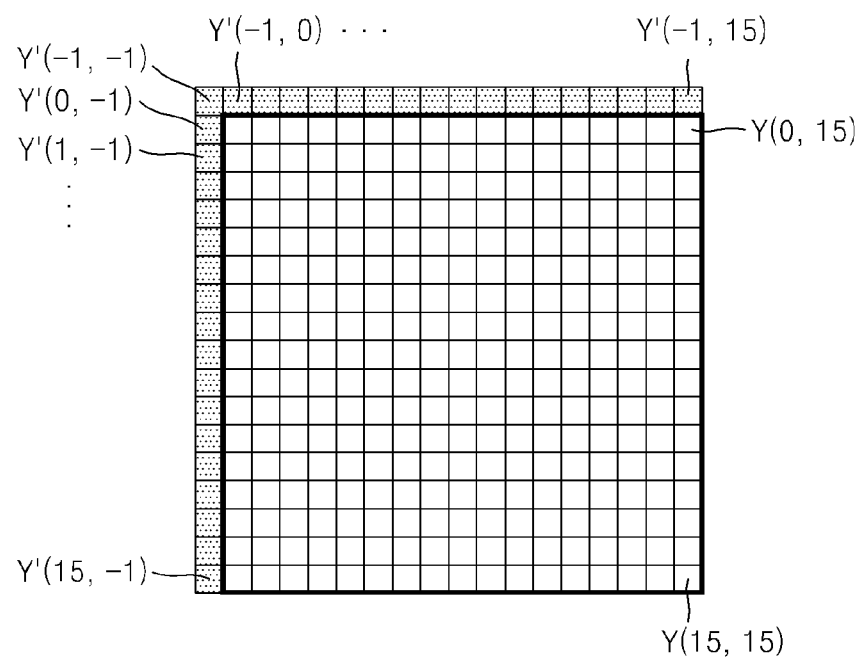
FIG. 4B is a reference diagram illustrating the inter color compensation algorithm according to another exemplary embodiment of the present invention.

FIG. 3 is a diagram illustrating the relationship between a reference block 611 of a reference picture of a first color component image 610 that has been encoded and restored, and a current block 621 that is to be encoded in a current picture of a second color component image 620, according to an exemplary embodiment of the present invention. FIGS. 4A and 4B are reference diagrams illustrating the inter color compensation algorithm according to exemplary embodiments of the present invention. In FIG. 4A, a square block defined by thick solid lines denotes a reference block of a first color component image. In FIG. 4B, a square block defined by thick solid lines denotes a current block of a second color component image. Also, in FIGS. 4A and 4B, shaded regions denote neighboring pixels.

As described above, if an input image consists of two or more color component images, a first color component image selected from among the color component images is first encoded and restored, and then a second color component image of the two or more color component images can be predicted using the correlation between the second color component image and the restored first color component image.

Referring to FIG. 3, the current block 621 that is to be encoded in the current picture 620 of the second color component image, can be predicted using restored pixel values of the reference block 611 located at a location, which corresponds to the location of the current block 621 in the current picture 620, in the reference picture 610 of the encoded and restored first color component image.

Referring to FIGS. 4A and 4B, if the value of a restored pixel at a location (i,j) in a reference block of a first color component image that has been encoded and restored is X'(i,j) and the value of a pixel at a location (i,j) in a current block of a second color component image is Y(i,j), then the predicted block generation unit 210 of FIG. 2 calculates a predicted value $Y_E(i,j)$ of the pixel at the location (i,j) in the current block of the second color component image by substituting pixels in the reference block of the restored first color component image for a predetermined function $f$ representing the correlation between the reference block of the first color component and the current block of the second color component (i=0, 1, ..., 15, j=0, 1, ..., 15), as follows:

$$Y_E(i,j) = f\{X(0,0), X(0,1), \ldots, X(14,15), X(15,15)\}_{i,j} \quad (1)$$

The predicted block generation unit 210 may use a linear regression model as the function $f$, as follows:

$$Y_E(i,j) = a^* X'(i,j) + b \quad (2),$$

wherein a and b denote compensation parameters obtained using linear regression modeling. For example, a and b may be determined in such a way that the differences between the values of neighboring pixels of the current block of the second color component image, which are predicted using the values of restored neighboring pixels of the reference block of the first color component image, and the values of the original neighboring pixel of the current block can be minimized.

As described above, the predicted block generation unit 210 generates a predicted block of the current block of the second color component image by predicting the values of the pixels in the current block by using the pixels in the reference block of the encoded and restored first color component image.

Referring to FIG. 2, the first residual block generation unit 220 generates a first residual block by calculating the difference between the values of the predicted block of the current block of the second color component image, and the original current block.

If the value of the pixel at the location (i,j) in the current block of the second color component image and a predicted value of the pixel are respectively Y(i,j) and $Y_E(i,j)$, the value ($C_1(i,j)$) of a residual pixel at the location (i,j) in the first residual block can be calculated by:

$$C_1(i,j) = Y(i,j) - Y_E(i,j) \quad (3)$$

The neighboring pixel prediction unit 230 predicts neighboring pixel values of the current block of the second color component image by using the corresponding neighboring pixels of the reference block of the first color component image.

Referring to FIGS. 4A and 4B, the neighboring pixel prediction unit 230 generates predicted values of the neighboring pixels of the current block of the second color component image by substituting the neighboring pixels of the reference block of the first color component image for Equation (1) or (2). For example, if the linear regression model expressed in Equation (2) is used, a predicted value Y'E(−1,0) of a neighboring pixel at a location (−1,0) of the current block of the second color component image may be calculated using a neighboring pixel X'(−1,0) at a location (−1,0) in the reference block of the first color component image, as follows:

$$Y'_E(-1,0)=a*X'(-1,0)+b \qquad (4),$$

wherein a and b denoting compensation parameters available for prediction of a neighboring pixel are respectively, preferably equal to the compensation parameters a and b in Equation (2) that are used to generate a predicted block of the current block of the second color component image by using the reference block of the first color component image.

The predicted residual block generation unit 240 generates residual neighboring pixels representing the differences between the predicted values of the neighboring pixels of the current block of the second color component image that are predicted by the neighboring pixel prediction unit 230, and the values of the corresponding restored neighboring pixels. For example, similarly as in Equation (3), the value of ($C_1(i,j)$) of each of the neighboring pixels of the current block of the second color component image can be calculated by:

$$C_1(i,j)=Y(i,j)-Y(i,j) \qquad (5)$$

A process of calculating residual pixel values of the neighboring pixels of the current block of the second color component image is the same as a process of calculating the values of residual pixels in the first residual block, except that restored neighboring pixels are used.

The predicted residual block generation unit 240 predicts a first residual block by using the residual neighboring pixels of the current block of the second color component image.

A process of predicting the first residual block by using the residual neighboring pixels of the current block of the second color component image will now be described in greater detail. Hereinafter, a predicted first residual block is referred to as a predicted residual block.

Figure 5A:
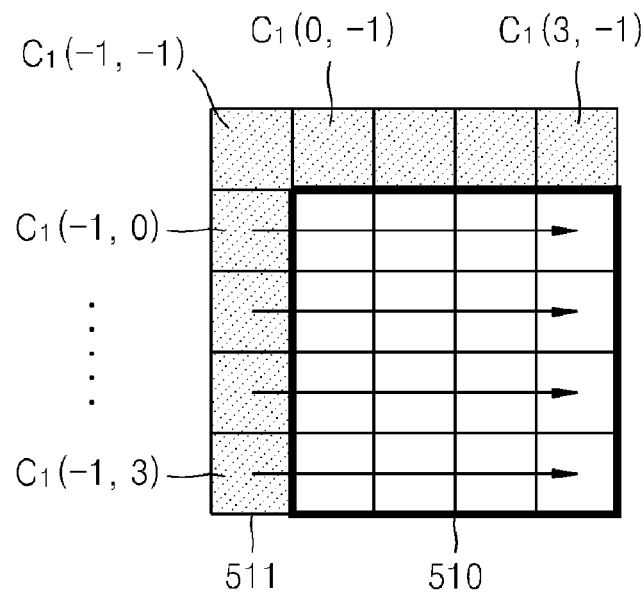
FIGS. 5A through 5C are diagrams illustrating a process of predicting a first residual block by using residual neighboring pixels of a current block, according to an exemplary embodiment of the present invention.
Figure 5B:
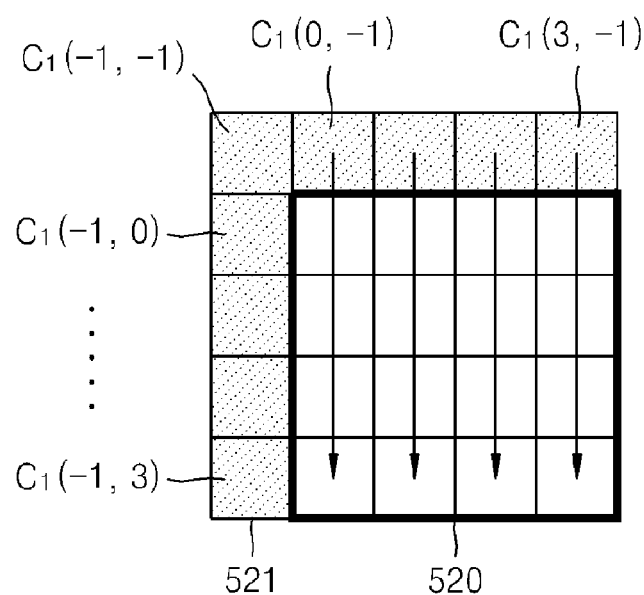
Figure 5C:
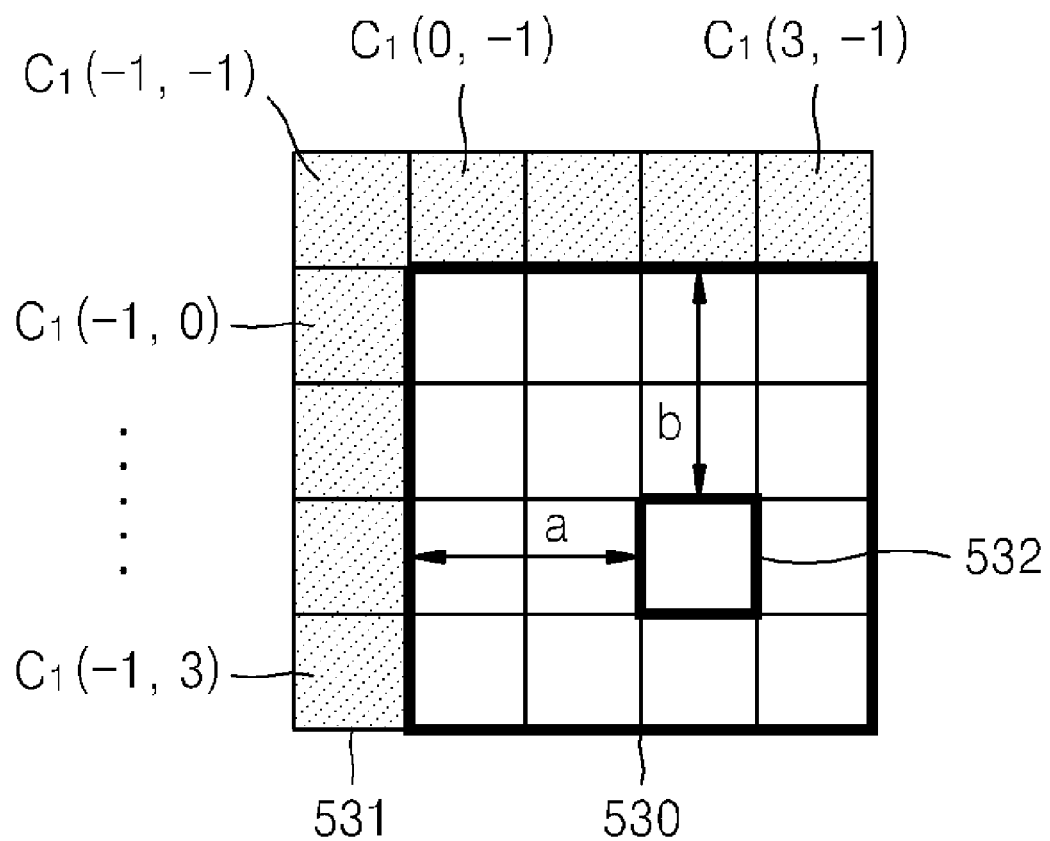

FIGS. 5A through 5C are diagrams illustrating a process of predicting a first residual block by using residual neighboring pixels of a current block, according to an exemplary embodiment of the present invention. In detail, FIGS. 5A through 5C illustrate a process of predicting a first residual block by using residual neighboring pixels which are illustrated as shaded areas when the size of a current block is 4×4.

The predicted residual block generation unit 240 of FIG. 2 predicts the first residual block of the current block by extending the residual neighboring pixels of the current block in a predetermined direction, similar to intra prediction; or predicts residual pixel values of the first residual block of the current block by using weight prediction in which predetermined weights are respectively allocated to the residual neighboring pixels so that the weights are inversely proportional to the distances between a residual pixel that is to be predicted in a predicted residual block and the residual neighboring pixels, the residual neighboring pixels are respectively multiplied by the allocated weights, and then the multiplication results are added together, or using the average of residual neighboring pixel values.

Referring to FIG. 5A, if a horizontal intra prediction mode is applied, the predicted residual block generation unit 240 may generate a predicted residual block of a current block 510 by extending residual neighboring pixels $C_1(-1,0), \ldots, C_1(-1,3)$ positioned to the left side of the current block 510 in a horizontal direction. That is, the predicted residual block generation unit 240 may generate the predicted residual block in such a way that the value of a pixel in each row of the predicted residual block of the current block 510 is equal to a residual pixel value of a neighboring pixel adjacent to the left side of the pixel.

Referring to FIG. 5B, if a vertical intra prediction mode is applied, the predicted residual block generation unit 240 may generate a predicted residual block of a current block 520 by extending residual neighboring pixels $C_1(0,-1), \ldots, C_1 3,-1)$ adjacent to an upper part of the current block 520 in a vertical direction. Although not shown in the drawings, if a DC intra prediction mode is applied, the predicted residual block generation unit 240 may calculate the average of residual neighboring pixel values of neighboring pixels of a current block and then determine the average as a predicted value of a first residual block of the current block.

Referring to FIG. 5C, if a weighted prediction mode is applied, the predicted residual block generation unit 240 may respectively allocate predetermined weights to residual neighboring pixels so that the weights are inversely proportional to the distances between a residual pixel that is to be predicted in a predicted residual block and the residual neighboring pixels, multiply the residual neighboring pixels by the respective weights, and then determine the sum of the multiplication results as a predicted residual pixel value. For example, referring to FIG. 5C, if a weight allocated to a residual neighboring pixel $C_1(2,-1)$ adjacent to a pixel 532 at a location (3,3) in the vertical direction is W(b) and a weight allocated to a residual neighboring pixel $C_1(1, 2)$ adjacent to the pixel 532 in the horizontal direction is W(a), then a predicted residual pixel value ($C_{1\_Estimate}(3,3)$) of the pixel 532 can be calculated by:

$$C_{1\_estimate}(3,3)=W(a)*C_1(-1,2)+W(b)*C_1(2,-1) \qquad (6),$$

wherein W(a) may be determined to be inversely proportional to the horizontal distance a between a current pixel and a residual neighboring pixel adjacent to the current pixel in the horizontal direction. For example, W(a)=1/(a+1). Similarly, W(b) may be determined to be inversely proportional to the vertical distance b between the current pixel and a residual neighboring pixel adjacent to the current pixel in the vertical direction. For example, W(b)=1/(b+1)

Referring to FIG. 2, the second residual block generation unit 250 generates a second residual block by calculating the difference between the pixel value ($C_1(i,j)$) of the first residual block generated by the first residual block generation unit 220 and the predicted value ($C_{1\_Estimate}(i,j)$) of the first residual block generated by the predicted residual block generation unit 240. Then, transformation, quantization, and entropy encoding are sequentially performed on the second residual block and thereafter the resultant value is output in the form of a bitstream.

Figure 6:
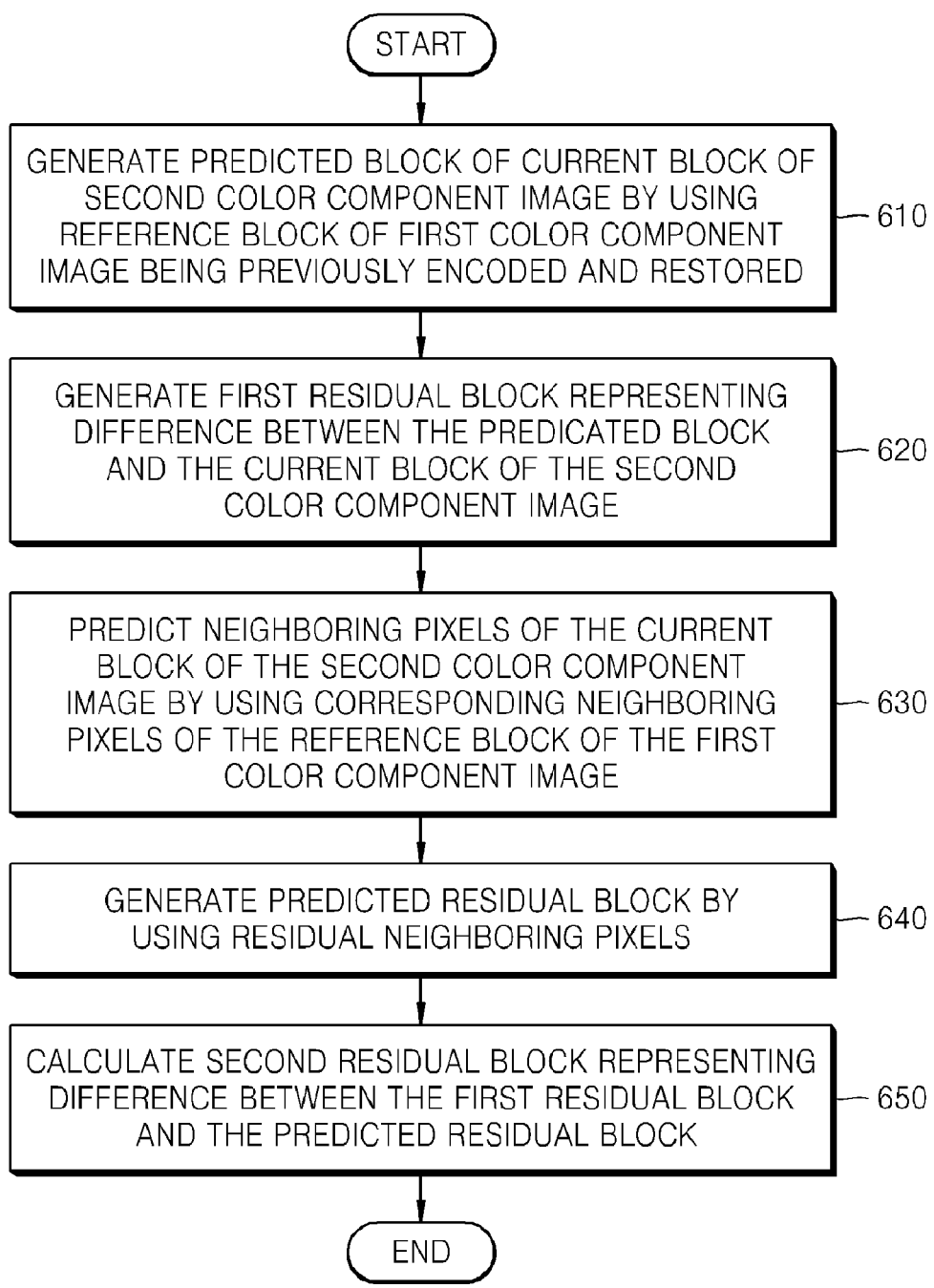
FIG. 6 is a flowchart illustrating a method of encoding an image according to an exemplary embodiment of the present invention.

FIG. 6 is a flowchart illustrating a method of encoding an image according to an exemplary embodiment of the present invention.

Referring to FIG. 6, in operation 610, a predicted block of a current block that is to be encoded in a second color component from among two or more color component images included in an input image, is generated using a reference block of an already encoded and restored first color component image of the two or more color component images. As described above, it is possible to produce a predicted block of the current block of the second color component image, which corresponds to the reference block, by applying the inter color compensation algorithm to the reference block. For example, a G color component image of an input image containing three R, G, B color component images is first encoded and restored according to a general image encoding method, and then a predicted block of a current block that is to be encoded in the R or B color component image is produced by applying the inter color compensation algorithm to a reference block of the restored G color component image. Assuming that encoding is sequentially performed on the G, B, R color component images, if the G color component image is used as a first color component image, the B or R color component image is used as a second color component image. Further, the R color component image may be encoded by using the B color component image prediction encoded using the G color component image as a first color component image and the R color component image as a second color component image, according to an image encoding method according to the present invention.

In operation 620, a first residual block is produced by calculating the difference between the predicted block of the current block of the second color component image, and the original current block of the second color component.

In operation 630, neighboring pixels of the current block of the second color component image are predicted using corresponding neighboring pixels of the reference block of the first color component image. Inter color compensation parameters used for prediction of the current block in operation 610 may be used in order to predict the neighboring pixels of the current block of the second color component image.

In operation 640, residual neighboring pixels representing the differences between the predicted neighboring pixels and the corresponding original neighboring pixels of the current block of the second color component image are calculated, and then a predicted residual block that is a predicted block of the first residual block is produced using the residual neighboring pixels of the current block of the second color component image. As described above, a predicted residual block may be generated according to one selected from among the DC intra prediction mode, the vertical intra prediction mode, the horizontal intra prediction mode, and the weighted prediction mode.

In operation 650, a second residual block is produced by calculating the difference between the first residual block of the second color component image and the predicted residual block. Then, transformation, quantization, and entropy encoding are sequentially performed on the second residual block of the second color component image and thereafter the resultant value is output in the form of a bitstream.

The image encoding method according to the present invention may be performed in units of various sized blocks, e.g., 16×16, 8×8, and 4×4 blocks. If predicted residual blocks are produced in 8×8 and 4×4 sub block units, a predicted residual block of each sub block of a macro block may be individually produced according to one of the DC intra prediction mode, the vertical intra prediction mode, the horizontal intra prediction mode, and the weighted prediction mode. In this case, a prediction mode that is to be applied to each sub block is determined in such a way that the energy of a second residual block that is to be produced can be minimized.

The image encoding method according to the present invention may also be performed according to either one of a variable mode in which different sized prediction unit modes can be respectively applied to blocks that are to be encoded, or a fixed mode in which encoding is performed within one slice or one frame in fixed-sized block units. If information regarding prediction modes for all respective blocks is transmitted, a large amount of bits may be generated and a large amount of calculation may be needed for determination of prediction modes. Thus, an image may be encoded by applying a fixed 4×4 mode to all frames, and the same prediction mode may be applied to 16 4×4 blocks in one macro block. In this case, information regarding a prediction mode applied to generation of each predicted residual block can be included in each macro block, and therefore it is possible to efficiently transmit the prediction mode information to a decoding terminal without greatly increasing the amount of data that is to be added so that the decoding terminal can perform image decoding.

Figure 7:
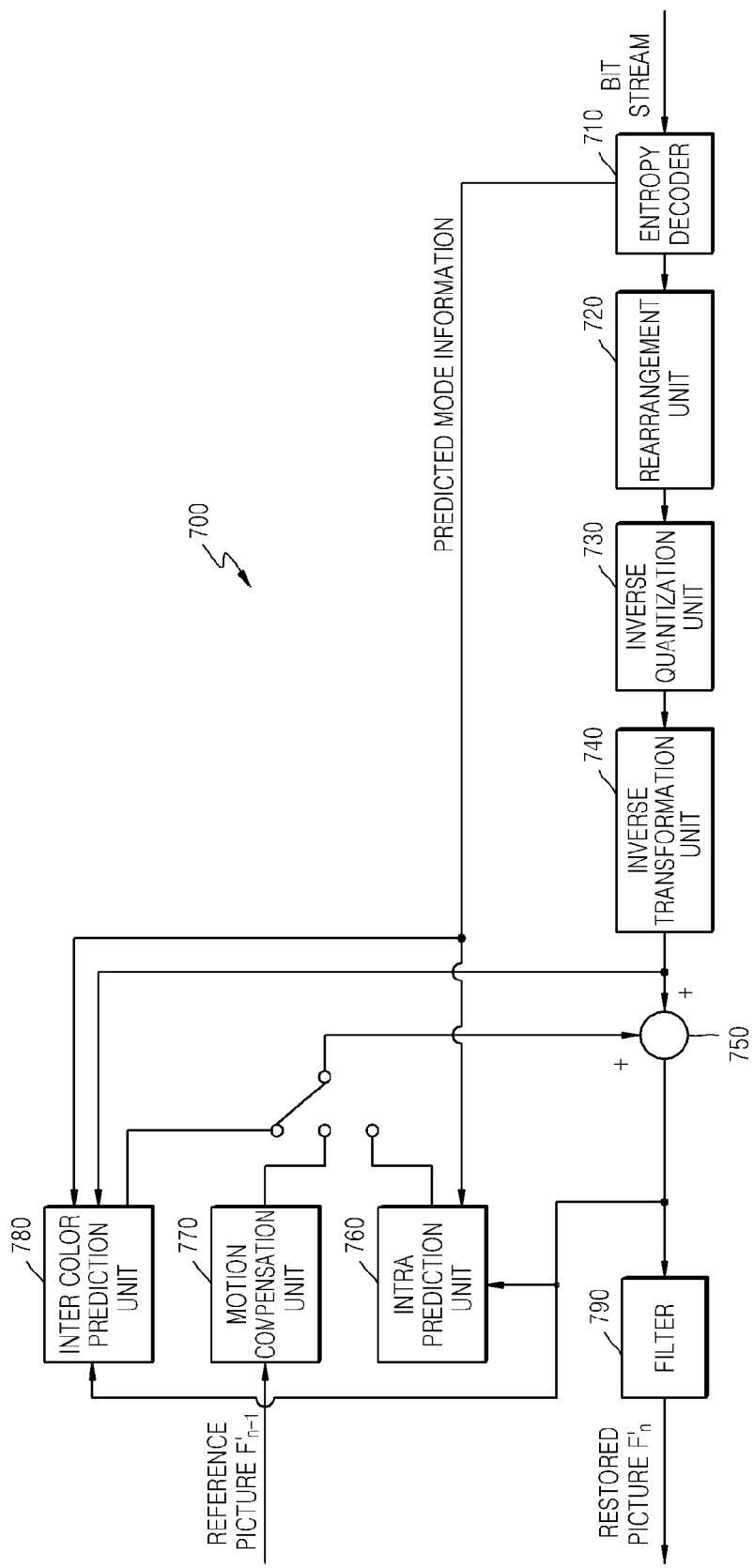
FIG. 7 is a block diagram of an image decoding apparatus according to an exemplary embodiment of the present invention.

FIG. 7 is a block diagram of an image decoding apparatus 700 according to an exemplary embodiment of the present invention. Referring to FIG. 7, the image decoding apparatus 700 includes an entropy decoder 710, a rearrangement unit 720, an inverse quantization unit 730, an inverse transformation unit 740, an addition unit 750, an intra prediction unit 760, a motion compensation unit 770, an inter color prediction unit 780, and a filter 790.

The entropy decoder 710 and the rearrangement unit 720 receive a compressed bitstream, entropy decode the bitstream, and generate quantized coefficients. The inverse quantization unit 730 and the inverse transformation unit 740 respectively inversely quantizes and inversely transforms the quantized coefficients so as to extract residual block information, motion vector information, and prediction mode information regarding a color component image. The prediction mode information may contain predetermined syntax information representing whether the bitstream has been obtained by generating a second residual block based on the correlation between color component images and encoding the second residual block. If the bitstream has been encoded using the image encoding method according to the present invention, the prediction mode information may contain prediction information used to predict the value of each pixel block of the remaining color component images, information regarding the size of each block used to generate a predicted residual block, and prediction direction in format ion.

If a current pixel block belongs to an intra predicted first color component image, the intra prediction unit 760 generates a predicted block by using neighboring blocks of the first color component image that have been previously decoded. If the current pixel block belongs to an inter predicted first color component image, the motion compensation unit 770 generates a predicted block by using motion compensation.

The predicted block of the first color component image that is generated using intra prediction or motion compensation, is combined with a residual block of the first color component image that is extracted from the bitstream, thus restoring the first color component image.

If the bitstream has been encoded using the image encoding method according to the present invention, the inter color prediction unit 780 generates a predicted pixel block of the remaining color component pixel block by using a reference block of the decoded first color component image.

Figure 8:
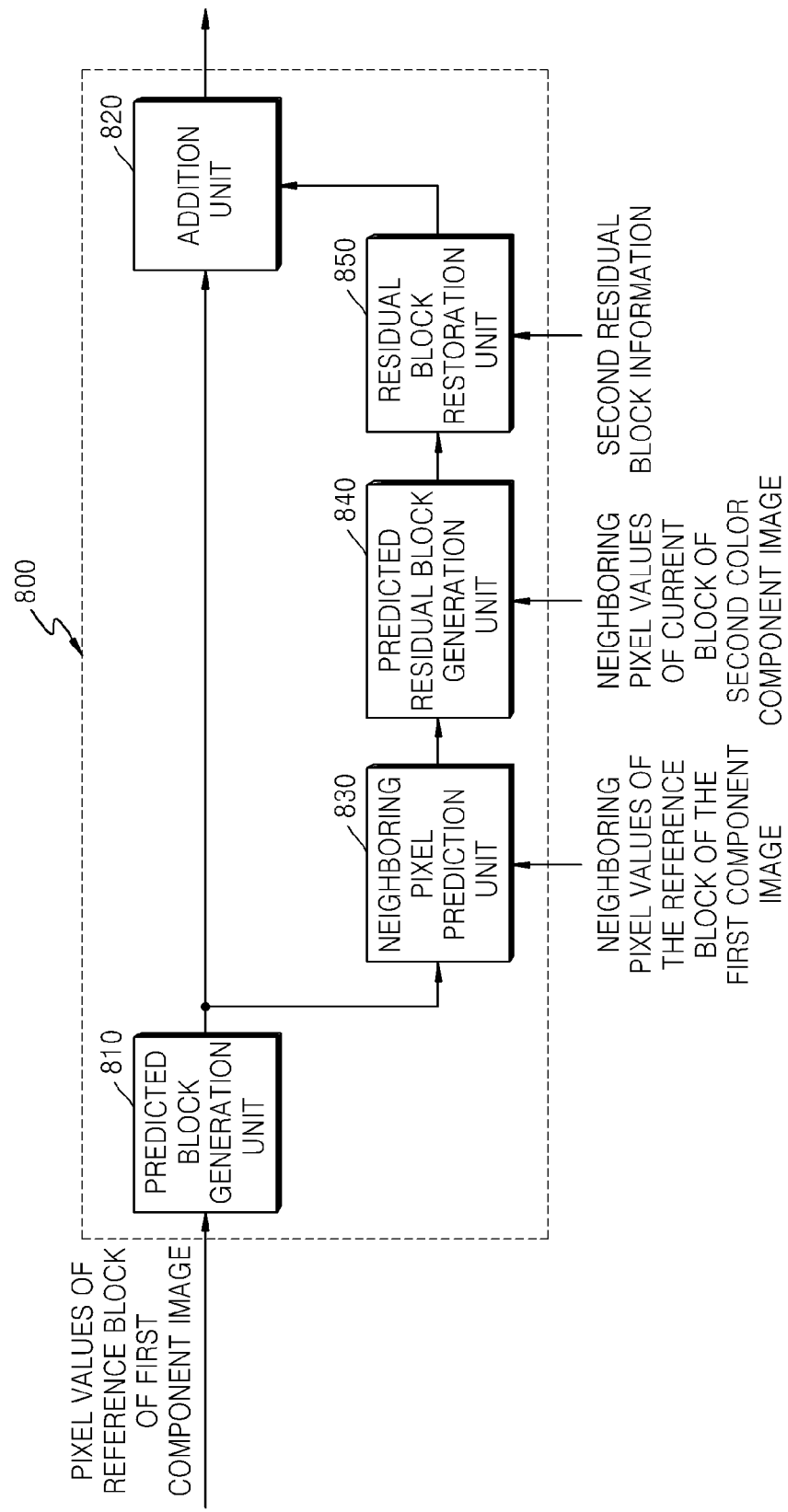
FIG. 8 is a block diagram of an inter color prediction apparatus according to an exemplary embodiment of the present invention.

FIG. 8 is a block diagram of an inter color prediction apparatus 800 according to an exemplary embodiment of the present invention. The inter color prediction apparatus 800 corresponds to the inter color prediction unit 780 illustrated in FIG. 7.

Referring to FIG. 8, the inter color prediction apparatus 800 includes a predicted block generation unit 810, a neighboring pixel prediction unit 830, a predicted residual block generation unit 840, a residual block restoration unit 850, and an addition unit 820.

The predicted block generation unit 810 generates a predicted block of a current block that is to be decoded in a second color component image by using a reference block of a previously decoded first color component image.

The neighboring pixel prediction unit 830 predicts neighboring pixels of the current block of the second color component image by using corresponding neighboring pixels of the reference block of the first color component image.

The predicted residual block generation unit 840 calculates the values of residual neighboring pixels representing the differences between the predicted neighboring pixels and previously restored neighboring pixels of the current block of the second color component image, and generates a predicted residual block corresponding to a predicted block of a first residual block by using the calculated residual neighboring pixel values. As described above, the first residual block corresponds to the difference between the current block that is to be decoded and the predicted block.

The residual block restoration unit 850 generates the first residual block by combining information regarding a second residual block representing the difference between the first residual block and the predicted residual block with the predicted residual block, where the information is contained in a bitstream.

The addition unit 820 combines the first residual block and the predicted block so as to decode the current block of the second color component image.

Figure 9:
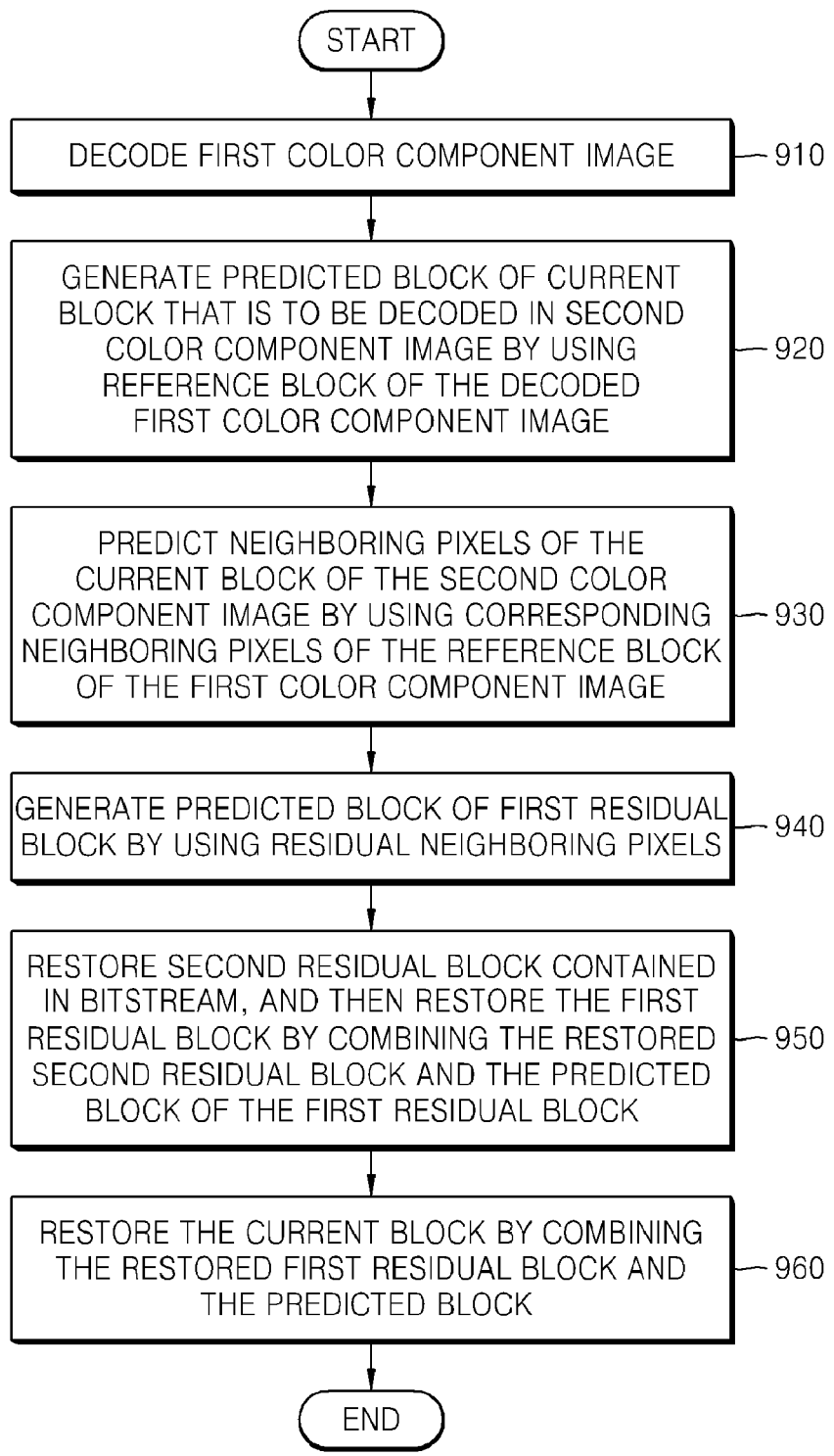
FIG. 9 is a flowchart illustrating a method of decoding an image according to an exemplary embodiment of the present invention.

FIG. 9 is a flowchart illustrating a method of decoding an image according to an exemplary embodiment of the present invention. Referring to FIG. 9, in operation 910, a first color component image from among two or more encoded color component images contained in a received bitstream is first decoded.

In operation 920, a predicted block of a current block that is to be decoded in a second color component image of the two or more encoded color component images which is the other color component image is produced using a reference block of the decoded first color component image.

In operation 930, neighboring pixels of the current block of the second color component image are predicted using corresponding neighboring pixels of the reference block of the decoded first color component image.

In operation 940, the values of residual neighboring pixels representing the differences between the predicted neighboring pixels and previously restored neighboring pixels of the current block of the second color component image are calculated, and then a predicted value of a first residual block representing the difference between the current block and the predicted block is generated using the calculated residual neighboring pixel values.

In operation 950, a second residual block representing the difference between the first residual block and the predicted residual block, which is contained in the bitstream, is combined with the predicted residual block thus combining a first residual block.

In operation 960, the first residual block and the predicted block are combined so as to decode the current block of the second color component image.

The present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

As described above, according to the present invention, it is possible to improve the coding efficiency of an image by additionally removing a correlation remaining in a residual image generated using inter color compensation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image, comprising:
   generating a predicted block of a current block that is to be encoded in a second color component image from among two or more color component images contained in a received image, by using an encoded and restored first color component image of the two or more color component images;
   generating a first residual block by calculating the difference between the predicted block and the current block of the second color component image;
   predicting neighboring pixels of the current block of the second color component image by using corresponding neighboring pixels of a reference block of the first color component image;
   generating a predicted residual block by using residual neighboring pixels representing the differences between the predicted neighboring pixels of the current block of the second color component image and the original neighboring pixels of the current block, where the predicted residual block is a predicted block of the first residual block; and
   generating a second residual block by calculating the difference between the first residual block and the predicted residual block.

2. The method of claim 1, wherein the generating of the predicted block of the current block comprises predicting pixel values of the current block of the second color component image by substituting pixel values of the reference block of the restored first color component image for a predetermined function representing the correlation between the reference block and the current block.

3. The method of claim 1, wherein, if the size of the reference block of the restored first color component image is i×j, the generating of the predicted block of the current block comprises predicting pixel values of the current block of the second color component image by using a linear regression model expressed in the following equation:

$$Y_E(i,j) = a \times X'(i,j) + b,$$

where $X'(i,j)$ denotes the value of a restored pixel at the i-th row and the j-th column of the reference block of the restored first color component image;
   $Y_E(i,j)$ denotes the value of a pixel of the current block of the second color component image, which corresponds to the pixel value $X'(i,j)$ of the current block of the second color component image;
   a denotes a predetermined weight; and
   b denotes a predetermined offset, where i and j are positive integers.

4. The method of claim 3, wherein a and b are determined in such a way that the differences between the predicted neighboring pixels and the original neighboring pixels of the current block of the second color component image are minimized, where the predicted neighboring pixels are predicted using restored neighboring pixel values of the reference block of the first color component image.

5. The method of claim 1, wherein the predicting of neighboring pixels of the current block of the second color component image comprises predicting neighboring pixel values of the current block of the second color component image by substituting neighboring pixel values of the reference block of the first color component image for the predetermined function representing the correlation between the reference block and the current block.

6. The method of claim 1, wherein the generating of a predicted residual block comprises generating the predicted residual block by performing intra prediction using the residual neighboring pixels according to a prediction mode selected from among a DC intra prediction mode, a vertical intra prediction mode and a horizontal intra prediction mode.

7. The method of claim 1, wherein the generating of a predicted residual block comprises generating the predicted residual block by using weight prediction in which predetermined weights are respectively allocated to the residual neighboring pixels, the residual neighboring pixels are respectively multiplied by the weights, and then the multiplication results are added together, where the weights are respectively determined to be inversely proportional to the distances between a predicted residual pixel that is to be predicted in the predicted residual block and the residual neighboring pixels.

8. The method of claim 1, wherein the generating of a predicted residual block is performed according to either one of a fixed prediction mode in which the same prediction mode is applied in predetermined image encoding units each consisting of a plurality of blocks, and a variable prediction mode in which different prediction modes are applied to blocks that are to be encoded.

9. An image encoding apparatus comprising:
a predicted block generation unit which generates a predicted block of a current block that is to be encoded in a second color component image, which is one of two or more color component images contained in a received image, by using a reference block of an encoded and restored first color component image of the two or more color component images;
a first residual block generation unit which generates a first residual block by calculating the difference between the predicted block and the original current block of the second color component image;
a neighboring pixel prediction unit which predicts neighboring pixels of the current block of the second color component image by using corresponding neighboring pixels of the reference block of the first color component image;
a predicted residual block generation unit which generates a predicted residual block by using residual neighboring pixels representing the differences between predicted pixels of neighboring pixels of the current block of the second color component image and the original neighboring pixels of the current block, where the predicted residual block is a predicted block of the first residual block; and
a second residual block generation unit which generates a second residual block by calculating the difference between the first residual block and the predicted residual block.

10. The apparatus of claim 9, wherein the predicted block generation unit predicts pixel values of the current block of the second color component image by substituting pixel values of the reference block of the restored first color component image for a predetermined function representing the correlation between the reference block and the current block.

11. The apparatus of claim 9, wherein, if the size of the reference block of the restored first color component image is i×j, the predicted block generation unit predicts pixel values of the current block of the second color component image by using a linear regression model expressed in the following equation:

$$Y_E(i,j)=a \times X'(i,j)+b,$$

where $X'(i,j)$ denotes the value of a restored pixel at the i-th row and the j-th column of the reference block of the restored first color component image;
$Y_E(i,j)$ denotes the value of a pixel of the current block of the second color component image, which corresponds to the pixel value $X'(i,j)$ of the current block of the second color component image;
a denotes a predetermined weight; and
b denotes a predetermined offset, where i and j are positive integers.

12. The apparatus of claim 11, wherein a and b are determined in such a way that the differences between the predicted neighboring pixels and the original neighboring pixels of the current block of the second color component image are minimized, where the predicted neighboring pixels are predicted using restored neighboring pixel values of the reference block of the first color component image.

13. The apparatus of claim 9, wherein the neighboring pixel prediction unit predicts neighboring pixel values of the current block of the second color component image by substituting neighboring pixel values of the reference block of the first color component image for the predetermined function representing the correlation between the reference block and the current block.

14. The apparatus of claim 9, wherein the predicted residual block generation unit generates the predicted residual block by performing intra prediction using the residual neighboring pixels according to a prediction mode selected from among a DC intra prediction mode, a vertical intra prediction mode and a horizontal intra prediction mode.

15. The apparatus of claim 9, wherein the predicted residual block generation unit generates the predicted residual block by using weight prediction in which predetermined weights are respectively allocated to the residual neighboring pixels, the residual neighboring pixels are respectively multiplied by the weights, and then the multiplication results are added together, where the weights are respectively determined to be inversely proportional to the distances between a predicted residual pixel to be predicted in the predicted residual block, and the residual neighboring pixels.

16. A method of decoding an image, comprising:
decoding a first color component image which is one of two or more encoded color component images contained in a received bitstream;
generating a predicted block of a current block that is to be decoded in a second color component image of the two or more encoded color component images by using a reference block of the decoded first color component image;

predicting neighboring pixels of the current block of the second color component image by using corresponding neighboring pixels of the reference block of the first color component image;

generating a predicted residual block by using residual neighboring pixels representing the differences between predicted pixels of the neighboring pixels of the current block of the second color component image and previously restored neighboring pixels of the current block, where the predicted residual block corresponds to a predicted block of a first residual block representing the difference between the current block and the predicted block;

generating the first residual block by combining the predicted residual block and a second residual block which represents the difference between the first residual block and the predicted residual block, where the second residual block is included in the bitstream; and decoding the current block by combining the first residual block and the predicted block.

17. The method of claim 16, wherein the generating of the predicted block of the current block comprises predicting pixel values of the current block of the second color component image by substituting pixel values of the reference block of the decoded first color component image for a predetermined function representing the correlation between the reference block and the current block.

18. The method of claim 16, wherein, if the size of the reference block of the decoded first color component image is i×j, the generating of the predicted block of the current block comprises predicting pixel values of the current block of the second color component image by using a linear regression model expressed in the following equation:

$$Y_E(i,j)=a \times X'(i,j)+b,$$

where X'(i,j) denotes the value of a decoded pixel at the i-th row and the j-th column of the reference block of the decoded first color component image;

$Y_E(i,j)$ denotes the value of a pixel of the current block of the second color component image, which corresponds to the pixel value X'(i,j) of the current block of the second color component image;

a denotes a predetermined weight; and b denotes a predetermined offset, where i and j are positive integers.

19. The method of claim 16, wherein the predicting of neighboring pixels of the current block of the second color component image comprises predicting neighboring pixel values of the current block of the second color component image by substituting neighboring pixel values of the reference block of the first color component image for the predetermined function representing the correlation between the reference block and the current block.

20. The method of claim 16, wherein the generating of a predicted residual block comprises generating the predicted residual block by using the residual neighboring pixels according to a prediction mode selected from among a DC intra prediction mode, a vertical intra prediction mode and a horizontal intra prediction mode.

21. An image decoding apparatus comprising:

a predicted block generation unit which generates a predicted block of a current block that is to be decoded in a second color component image, which is one of two or more encoded color component images contained in a received bitstream, by using a reference block of a decoded first color component image of the two or more encoded color component images;

a neighboring pixel prediction unit which predicts neighboring pixels of the current block of the second color component image by using corresponding neighboring pixels of the reference block of the first color component image;

a predicted residual block generation unit which generates a predicted residual block by using residual neighboring pixels representing the differences between predicted pixels of the neighboring pixels of the current block of the second color component image and previously restored neighboring pixels of the current block, where the predicted residual block corresponds to a predicted block of a first residual block representing the difference between the current block and the predicted block;

a residual block restoration unit which generates the first residual block by combining the predicted residual block and a second residual block which represents the difference between the first residual block and the predicted residual block, where the second residual block is included in the bitstream; and an addition unit which decodes the current block by combining the first residual block and the predicted block.

22. The apparatus of claim 21, wherein the predicted block generation unit predicts pixel values of the current block of the second color component image by substituting pixel values of the reference block of the decoded first color component image for a predetermined function representing the correlation between the reference block and the current block.

23. The apparatus of claim 21, wherein, if the size of the reference block of the decoded first color component image is i×j, the predicted block generation unit predicts pixel values of the current block of the second color component image by using a linear regression model expressed in the following equation:

$$Y_E(i,j)=a \times X'(i,j)+b,$$

where X'(i,j) denotes the value of a decoded pixel at the i-th row and the j-th column of the reference block of the decoded first color component image;

$Y_E(i,j)$ denotes the value of a pixel of the current block of the second color component image, which corresponds to the pixel value X'(i,j) of the current block of the second color component image;

a denotes a predetermined weight; and b denotes a predetermined offset, where i and j are positive integers.

24. The apparatus of claim 21, wherein the neighboring pixel prediction unit predicts neighboring pixel values of the current block of the second color component image by substituting neighboring pixel values of the reference block of the first color component image for the predetermined function representing the correlation between the reference block and the current block.

25. The apparatus of claim 21, wherein the predicted residual block generation unit generates the predicted residual block by using the residual neighboring pixels according to a prediction mode selected from among a DC intra prediction mode, a vertical intra prediction mode and a horizontal intra prediction mode.

* * * * *